Jan. 30, 1968   K. C. STEPHENSON   3,366,294
SAFETY CARRIER FOR INFANTS
Filed Dec. 27, 1966   2 Sheets-Sheet 1
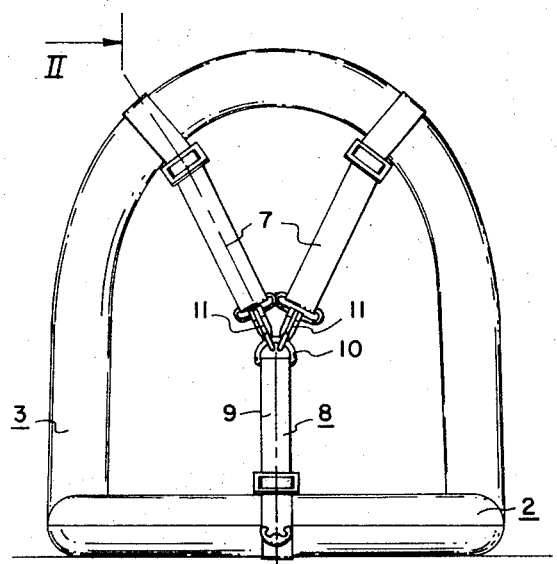
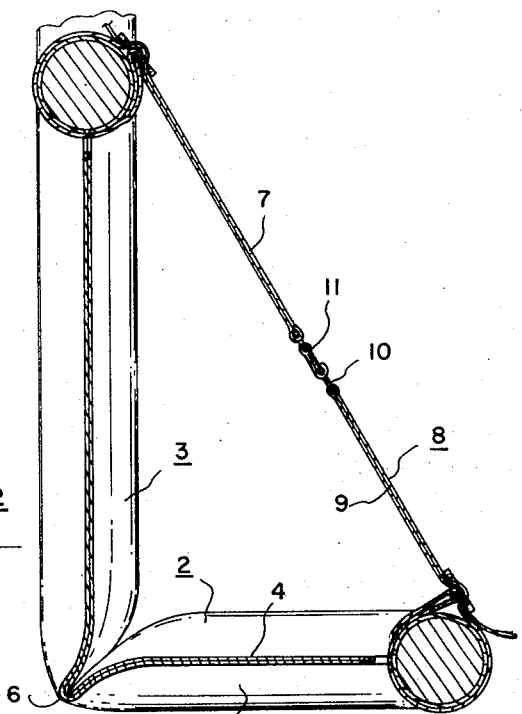
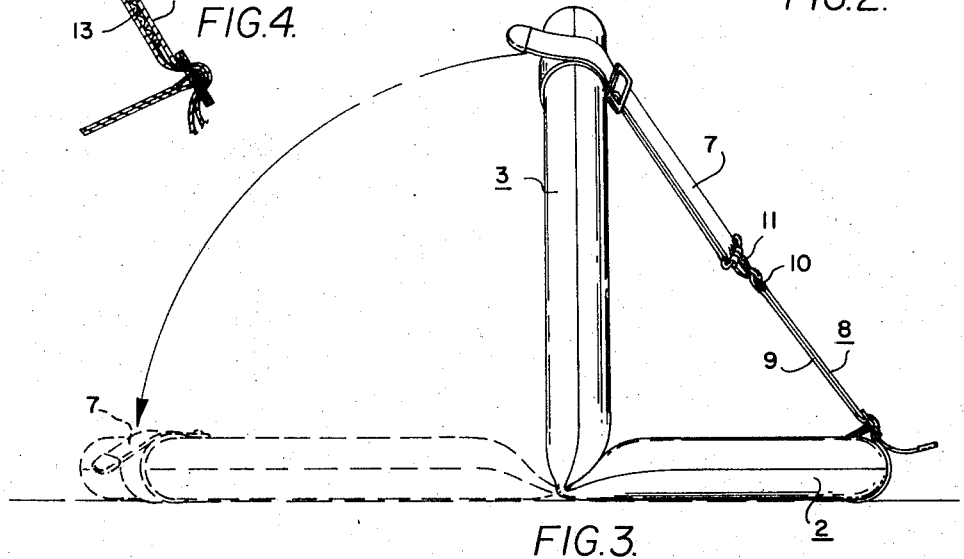
KAY C. STEPHENSON
INVENTOR
BY
Edward Hoopes III
HER ATTORNEY Jan. 30, 1968 K. C. STEPHENSON 3,366,294

SAFETY CARRIER FOR INFANTS

Filed Dec. 27, 1966 2 Sheets-Sheet 2

KAY C. STEPHENSON
INVENTOR
BY
Edward Hoopes III

HER ATTORNEY

United States Patent Office 3,366,294
Patented Jan. 30, 1968

3,366,294
SAFETY CARRIER FOR INFANTS
Kay C. Stephenson, 1701 N. 47th Place,
Phoenix, Ariz. 85018
Filed Dec. 27, 1966, Ser. No. 605,005
10 Claims. (Cl. 224—29)

ABSTRACT OF THE DISCLOSURE

A portable self-contained safety carrier for infants adapted for carrying infants in the arms or in a vehicle. The carrier has articulated first and second portions movable to different relative angular positions so that the infant may lie flat or may assume a sitting posture. Edging or padding of soft material is applied to such portions, the infant's legs being disposed over or against the edging of the first portion and the infant's body being substantially surrounded by the edging with the infant's head against the edging of the second portion. Straps are applied to the safety carrier for holding the infant in place. The straps may extend about the edging. Two straps pass over the infant's shoulders and a third strap extends between the infant's legs and is fastened to the first two straps. One of the straps, normally the third strap, has a loop for receiving an automobile seat belt.

---

This invention relates to a safety carrier for infants which is portable and self-contained, light in weight yet strong, made substantially entirely of soft material and low in cost. Due to the novel manner in which the elements of the safety carrier are related to each other an infant disposed on the safety carrier is held and protected against falling in any direction and the head of a small infant is restrained against movement to either side, yet the carrier is completely free from rigid bars or braces.

My novel portable self-contained safety carrier for infants may be used for protecting an infant while carrying the infant in the arms or maintaining or transporting the infant in a carriage or stroller either lying down or in a seated posture or seated in a high chair, shopping cart or other similar device and it may also be used in conjunction with an automobile seat belt for holding the infant, either lying down or in a seated posture, safely and securely on a seat of an automobile for which no brackets, hangers or other fastening devices other than the seat belt itself are required.

The safety carrier comprises a first portion for receiving the part of the infant's body below the waist and a second portion for receiving the part of the infant's body above the waist. Both of the first and second portions are of flexible sheet material which may be any suitable material such as cloth or plastic, and they are joined to each other at the rear of the first portion and the front of the second portion so that the first portion and the second portion may articulate or assume different relative angular positions. The front and sides of the first portion and the rear and sides of the second portion have applied thereto edging or padding of soft material, which may be any suitable material such as cotton padding or polyurethane foam, protruding therefrom in the direction toward the infant's body. The edging or padding may also protrude in the opposite direction. The first portion and the second portion assume natural relative positions under the circumstances of use, the joint therebetween acting similarly to a hinge so that the carrier may be disposed substantially in a plane to receive the infant in lying down position or with the first and second portions at an acute or right angle to each other to receive the infant in a seated posture or lying on its back with its legs extending upwardly.

The carrier is sized and proportioned so that an infant disposed thereon may have the edging or padding at the front of the first portion disposed under its legs with the edging at the sides of the first portion and the rear and sides of he second portion substantially surrounding the infant's body and the infant's head against the edging at the rear of the second portion. A smaller infant may have its entire torso and head framed by the edging with the edging at the rear of the back portion against the top or the upper part of the back of the infant's head while a larger infant may have its torso framed by the edging with the edging at the rear of the back portion against the middle or lower part of the back of the infant's head. The edging at the rear and sides of the second portion is preferably continuous and of substantially U shape.

I apply straps to the safety carrier for holding the infant in place. The straps are adjustable in length to accommodate the safety carrier to infants of different sizes and the first and second portions of the carrier to different relative angular positions. I preferably apply straps to the second portion of the carrier at either side of the rear thereof extending over the shoulders of an infant disposed on the carrier and a strap to the first portion at the front of the first portion extending between the infant's legs and connected to the first mentioned straps. The last mentioned strap may have a ring and the first mentioned straps may have fastening devices fastened to the ring. The straps preferably extend about the edging of the safety carrier, and for a small infant the straps applied to the second portion and which extend over the shoulders of the infant are preferably disposed adjacent the sides of the infant's head to inhibit sidewise movement of the head.

At least one of the straps desirably has a loop for receiving an automobile seat belt. The loop is preferably in the strap which is applied to the first portion at the front of the first portion and extends between the infant's legs so that the automobile seat belt passes generally across the infant's body and is in effect integrated to the safety carrier by passing through the loop. An infant may be thus strapped to an automobile seat in either a lying down or a seated posture. When the infant is in a seated posture it faces forward. When it is in a lying down posture its head should be disposed forward since the front of the automobile seat is normally higher than the rear; the infant's feet may extend straight out from its body generally horizontally if the first and second portions of the carrier are generally coplanar, or the infant's feet may extend upwardly if the first and second portions of the carrier are at an acute or right angle to each other.

The safety carrier is flexible to adapt itself to the gentle curvatures of the seat portion or the seat and back portions of an automobile seat. When an infant disposed in the safety carrier is strapped to an automobile seat by the seat belt of the automobile the safety carrier will not tilt in any direction and the infant will be held in the seat even under the most severe impact. The safety carrier by reason of its substantial embracement of the infant affords stability to the infant which the infant without such embracement does not possess as well as protecting the infant in the event of an accident.

Other details, objects and advantages of the invention will become apparent as the following description of a present preferred embodiment thereof proceeds.

In the accompanying drawings I have shown a present preferred embodiment of the invention in which:

FIGURE 1 is a front elevational view of a safety carrier for infants in accordance with my invention showing the two articulated portions of the carrier disposed at substantially right angles to each other;

FIGURE 2 is a cross-sectional view on the line II—II of FIGURE 1;

FIGURE 3 is a side elevational view of the carrier showing in solid lines the two articulated portions of the carrier disposed at substantially right angles to each other and in broken lines the second portion turned down into substantially coplanar relationship with the first portion;

FIGURE 4 is a fragmentary detail view showing the loop in one of the straps with an automobile seat belt passing through the loop;

Figure 5:
FIGURE 5 is an illustration of a relatively large sized infant seated in the safety carrier and strapped to an automobile seat by the automobile seat belt.

Referring now more particularly to the drawings, FIGURES 1–4 show one form of my portable self-contained safety carrier for infants comprising a first portion designated generally by reference numeral 2 and a second portion designated generally by reference numeral 3. Each of the portions 2 and 3 is of flexible sheet material 4 edged with padding 5. The flexible sheet material may be cloth, plastic or any other suitable material; for purposes of explanation and illustration the flexible sheet material will be deemed to be vinyl plastic sheeting. The padding 5 may be of any suitable material such as cotton padding, foam rubber, etc. For purposes of explanation and illustration the padding material 5 will be deemed to be polyurethane foam.

The padding 5 is applied to the front and sides of the first portion 2 and to the rear and sides of the second portion 3. In FIGURES 1 and 2 the rear of the second portion 3 is at the top. The edging or padding 5 in the form shown is heat sealed to the flexible sheet material 4, although it may be otherwise attached as by adhesive, sewing, etc.

The first and second portions 2 and 3 of the carrier are joined to each other at the rear of the first portion 2 and the front of the second portion 3 so that the first portion 2 and the second portion 3 may assume different relative angular positions or, in other words, so that the first and second portions of the carrier are articulated. The flexible sheet material 4 may extend continuously through the first and second portions 2 and 3 but the edging 5 is not continuous, being interrupted at the joint between the first and second portions so that the portion of the flexible sheet material at the point indicated by reference numeral 6 in FIGURE 2 acts somewhat in the nature of a hinge allowing the portions 2 and 3 to move to different relative angular positions. In FIGURES 1 and 2 the portions 2 and 3 are shown as being disposed at right angles to each other. They are similarly shown in FIGURE 3 in solid lines but in that figure the portion 3 is shown in broken lines turned down into substantially coplanar relationship with the portion 2. Thus the carrier is adapted to have an infant disposed on it in either a seated position or a lying down position, the angularity between the portions 2 and 3 being adjusted as desired.

Straps are applied to maintain the infant in the carrier and to maintain the portions 2 and 3 of the carrier in desired relative angular positions. Two straps 7 are applied to the portion 3, one at each side of the rear thereof, and are adapted to extend at an angle generally toward each other over the shoulders of an infant disposed in the carrier as will presently appear. A third strap 8 is applied to the first portion 2 at the front thereof and is adapted to extend between the infant's legs and to be connected with straps 7. The strap 8 has a loop 9 with a ring 10 passing therethrough, and each of the straps 7 has at its extremity a fastener 11 adapted to be fastened to the ring 10 whereby the infant is securely strapped into the carrier. The straps 7 and 8 preferably extend about the edging as shown in FIGURES 1–3. They are adjustable as to length by any suitable adjusting means well known to those skilled in the art.

FIGURE 5 shows an infant seated in the carrier strapped to an automobile seat 12 by the automobile seat belt 13 which passes through the loop 9 of the strap 8. The seat belt 13 extends about the body of the infant and securely holds the infant and carrier against the seat portion and the back portion of the automobile seat, preventing tilting of the carrier in either sidewise direction or lurching forward of the infant in the event of a sudden stop. The flexibility of the carrier enables it to conform naturally to the curves of the seat portion and back portion of the automobile seat. The edging or padding 5 projects in both directions from the sheet material 4 affording a cushioning action as well as largely surrounding the infant's body. The lower portion of the infant's body is embraced by the padding 5 at the sides of the portion 2 with the infant's legs extending over the padding at the front thereof while for the relatively large sized infant shown in FIGURE 5 the torso of the infant is framed by the edging of the portion 3 and the middle or lower part of the back of the infant's head rests against the padding at the rear (top) of the portion 3.

Figure 6:
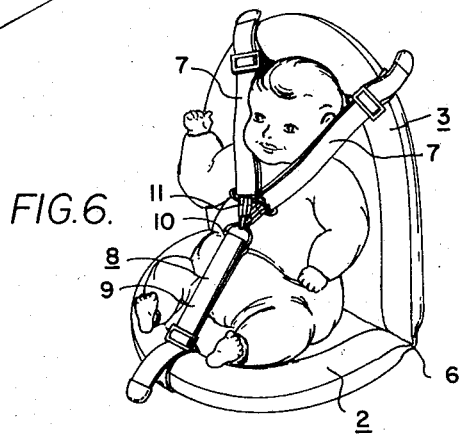
FIGURE 6 is an illustration of a relatively small sized infant seated in the safety carrier.

FIGURE 6 shows an infant of smaller size than that shown in FIGURE 5, the infant of FIGURE 6 being seated in the safety carrier with the portions 2 and 3 thereof at substantially right angles to each other. For the smaller sized infant of FIGURE 6 the entire torso and head of the infant are framed by the edging with the edging at the rear of the back portion 3 against the top or the upper part of the back of the infant's head. In this case the straps 7 closely embrace the sides of the infant's head to inhibit sudden sidewise movement of the infant's head. Although the infant shown in FIGURE 6 is not shown as being strapped into an automobile seat, this may be done, or the infant may be carried in the arms or in any other vehicle.

Figure 7:
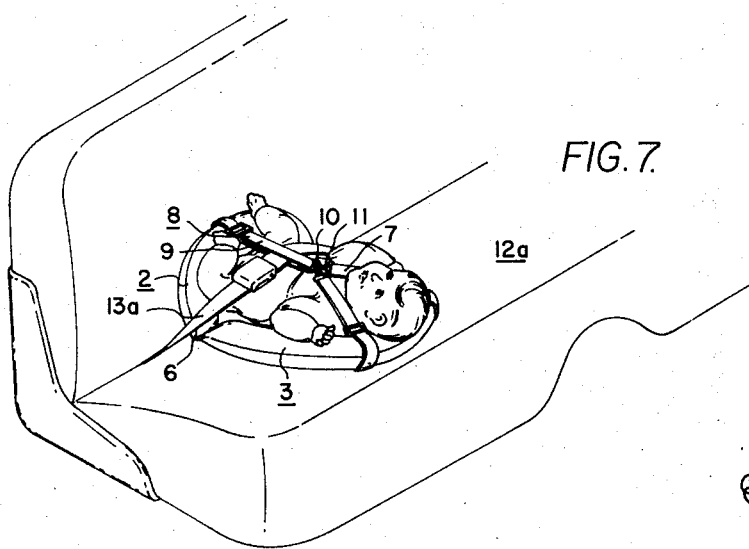
FIGURE 7 is an illustration of an infant disposed in the safety carrier strapped to an automobile seat by the automobile seat belt in lying down position.

FIGURE 7 shows an infant strapped to an automobile seat 12a by the automobile seat belt 13a, but in this case the infant is lying down on the automobile seat with its head forward. FIGURE 7 shows the portions 2 and 3 of the carrier disposed at substantially right angles to each other so that the infant's feet extend upwardly, but the portions 2 and 3 of the carrier may extend at other angles to each other, including a straight angle, in which case the infant lies flat with its legs extending straight out generally horizontally toward the rear of the vehicle.

While I have shown and described a present preferred embodiment of the invention it is to be distinctly understood that the invention is not limited thereto but may be otherwise variously embodied within the scope of the following claims.

I claim:

1. A portable self-contained safety carrier for infants comprising a first portion for receiving the part of the infant's body below the waist and a second portion for receiving the part of the infant's body above the waist, both of said portions being of flexible sheet material and joined to each other at the rear of the first portion and the front of the second portion so that the first portion and the second portion may assume different relative angular positions, the front and sides of the first portion and the rear and sides of the second portion having applied thereto edging of soft material protruding therefrom in the direction toward the infant's body, the carrier being sized and proportioned so that an infant disposed thereon will have the edging at the front of the first portion disposed under its legs with the edging at the sides of the first portion and the rear and sides of the second portion substantially surrounding the infant's body and the infant's head against the edging at the rear of the second portion and means connected with and extending between the first portion and the second portion limiting the relative angular positions of said portions.

2. A portable self-contained safety carrier for infants as claimed in claim 1 in which the edging at the rear and sides of the second portion is continuous and of substantially U shape.

3. A portable self-contained safety carrier for infants as claimed in claim 1 in which the last mentioned means comprise straps applied to the safety carrier and perform the additional function of holding the infant in the safety carrier.

4. A portable self-contained safety carrier for infants as claimed in claim 3 in which straps are applied to the second portion at either side of the rear of the second portion extending over the shoulders of an infant disposed on the safety carrier and a strap is applied to the first portion at the front of the first portion extending between the infant's legs and connected to the first mentioned straps.

5. A portable self-contained safety carrier for infants as claimed in claim 4 in which the last mentioned strap has a ring and the first mentioned straps have fastening devices fastened to the ring.

6. A portable self-contained safety carrier for infants as claimed in claim 3 in which the straps extend about the edging of the safety carrier.

7. A portable self-contained safety carrier for infants as claimed in claim 4 in which the straps extend about the edging of the safety carrier and for a small infant the straps applied to the second portion and which extend over the shoulders of the infant are disposed adjacent the sides of the infant's head to inhibit sidewise movement of the head.

8. A portable self-contained safety carrier for infants as claimed in claim 3 in which one of the straps has a loop for receiving an automobile seat belt.

9. A portable self-contained safety carrier for infants as claimed in claim 4 in which the last mentioned strap has a loop for receiving an automobile seat belt.

10. A portable self-contained safety carrier for infants as claimed in claim 5 in which the edging at the rear and sides of the second portion is continuous and of substantially U shape, the straps extend about the edging of the safety carrier and the last mentioned strap has a loop for receiving an automobile seat belt.

References Cited

UNITED STATES PATENTS

| | | | |
|---|---|---|---|
| 2,664,140 | 12/1953 | Kindelberger | 297—250 |
| 3,054,637 | 9/1962 | Pambello | 297—256 |
| 3,093,407 | 6/1963 | Wilson | 297—230 |
| 3,207,552 | 9/1965 | Loughney | 297—250 |

FOREIGN PATENTS

| | | |
|---|---|---|
| 514,945 | 7/1955 | Canada. |
| 896,515 | 5/1962 | Great Britain. |

GERALD M. FORLENZA, *Primary Examiner.*

HUGO O. SCHULZ, *Examiner.*

R. BALLANTYNE, *Assistant Examiner.*

UNITED STATES PATENT OFFICE
CERTIFICATE OF CORRECTION

Patent No. 3,366,294                      January 30, 1968

Kay C. Stephenson

It is hereby certified that error appears in the above numbered patent requiring correction and that the said Letters Patent should read as corrected below.

In the heading to the printed specification, lines 3 and 4, for "Kay C. Stephenson, 1701 N. 47th Place, Phoenix, Ariz. 85018" read -- Kay C. Stephenson, Phoenix, Ariz., assignor to Stephenson Industries, Inc., Phoenix, Ariz., a corporation of Arizonia --; column 2, line 7, for "he" read -- the --; column 3, line 73, after "with" insert -- the --.

Signed and sealed this 18th day of March 1969.

(SEAL)
Attest:

Edward M. Fletcher, Jr.                      EDWARD J. BRENNER

Attesting Officer                            Commissioner of Patents